United States Patent [19]

Kurosaki

[11] Patent Number: 4,817,250
[45] Date of Patent: Apr. 4, 1989

[54] CORD LOCK
[75] Inventor: Mutsuo Kurosaki, Yokohama, Japan
[73] Assignee: Nifco, Inc., Kanagawa, Japan
[21] Appl. No.: 146,552
[22] Filed: Jan. 21, 1988
[30] Foreign Application Priority Data
  Jan. 23, 1987 [JP] Japan ............................ 62-8231
[51] Int. Cl.⁴ ............................................. F16G 11/14
[52] U.S. Cl. ..................................... 24/115 G; 24/587
[58] Field of Search ...................... 24/115 G, 587, 543, 24/266; 403/215

[56] References Cited
U.S. PATENT DOCUMENTS

| Re. 27,986 | 4/1974 | Jensen | 24/115 G |
|---|---|---|---|
| 3,372,442 | 3/1968 | Ishimatsu | 24/587 |
| 3,670,449 | 6/1972 | Lemkin et al. | 446/125 |
| 4,188,686 | 2/1980 | Baum | 24/115 G |
| 4,453,292 | 6/1984 | Bakker | 24/115 G |
| 4,477,947 | 10/1984 | Lyons | 24/115 G |
| 4,582,447 | 4/1986 | Itoh | 446/125 |
| 4,621,393 | 11/1986 | Ambal | 24/576 |
| 4,622,723 | 11/1986 | Krauss | 24/115 G |

FOREIGN PATENT DOCUMENTS

| 4923670 | 2/1974 | Japan. | |
|---|---|---|---|
| 1081936 | 9/1967 | United Kingdom | 24/115 G |
| 2156903 | 10/1985 | United Kingdom | 24/543 |

Primary Examiner—Victor N. Sakran
Attorney, Agent, or Firm—Schwartz & Weinrieb

[57] ABSTRACT

A cord lock includes a pair of main bodies for permitting intermediate portions of a cord to be thrust therethrough and a pair of lock members mounted upon the main bodies respectively so as to develop a predetermined resisting force against longitudinal movement of the intermediate portions of the cord. Each of the main bodies is provided with an engaging projection and an engaging recess which permits the counterpart engaging projection to engage therein. The main bodies each having the engaging projection and recess are formed with identical configurations.

14 Claims, 6 Drawing Sheets

CORD LOCK

FIELD OF THE INVENTION

This invention relates to a cord lock for retaining or interlocking cords such as strings, straps, or the like.

DESCRIPTION OF THE PRIOR ART

Wind breakers, knapsacks, and the like are provided with a cord lock so that the degree to which a closure cord is to be tightened can be adequately adjusted.

This cord lock, as disclosed in Japanese Utility Model Public Disclosure No. SHO 49-23670, interlocks both ends of a looped cord, at a desired position. In this type of cord lock, the degree to which the cord can be suitably adjusted by changing the effective length of the loop portion of the cord.

However, in the conventional cord lock, both ends of the cord are thrust all the way through the interior of a main body integrally formed therewith and the tightening length can be changed by adequately changing the thrusting amount of the cord. Therefore, in order to completely release to the outside the loop portion of the cord formed in the shape of a loop, the cord must be removed from the main body. Due to the foregoing structure, when the cord is to be attached again, both ends of the cord must again be thrust into holes formed within the main body. Thus, the handling is inconvenient.

In view of te above, there has been proposed, as related art, a cord lock capable of holding intermediate portions of a cord in such a manner that they can be separated from each other (Japanese Utility Model applications No. SHO 61-147502 and No. SHO 61-171242). Of these, the cord lock proposed in Japanese Utility Model application No. SHO 61-147502, as shown in FIG. 11, has a pair of main bodies 2a and 2b for permitting intermediate portions of the cord to be inserted therein. One main body 2b is provided with a projection 3 which is engaged within an engaging member 4 of the other main body 2a, thereby interlocking the main bodies 2a and 2b together. Furthermore, the other main body 2a is provided with an unlocking knob 5. The main bodies 2a and 2b are disengaged from each other by operating the unlocking knob 5. As a result of this structure, the pair of main bodies 2a and 2b are separated from each other and, as a result, the intermediate portions 1a and 1b of the cord are separated apart. A cord lock of Japanese Utility Model application No. SHO 61-171242 also has similar component parts.

However, since the pair of main bodies require separates molds, the manufacturing costs become high.

OBJECT OF THE INVENTION

The present invention has been accomplished in view of the above-mentioned factors. It is therefore the object of the present invention to provide a cord lock capable of holding intermediate portions of a cord in such a manner as to be separated apart from each other and which is simple in structure and easy to manufacture.

SUMMARY OF THE INVENTION

To achieve the above-mentioned object, a cord lock according to the present invention comprises a pair of main bodies for permitting intermediate portions of a cord to be thrust therein, and a pair of lock members fitted respectively within the main bodies and adapted to generate a predetermined resisting force against movement of the intermediate portions of the cord in the longitudinal direction. Each of the main bodies is formed with an engaging projection and an engaging recess. The engaging projections of the main bodies are engaged within the corresponding engaging recesses of the main bodies. The pair of main bodies including the engaging projections and engaging recesses are formed so as to have an identical configuration.

As described in the foregoing, since the cord lock of the present invention comprises a pair of identical main bodies, it is only necessary to make one configuration for such identical main bodies and it is not necessary to make a pair of main bodies having different configurations as is the case with the conventional cord lock. Upon engagement of the engaging projection formed within one main body into the engaging recess formed within the other main body, the intermediate portions of a cord can be retained or interlocked. When separating, the engaging projection is simply disengaged from the engaging recess.

As apparent from the above-description, the cord lock of the present invention is easy to manufacture and has an economical structure.

BRIEF DESCRIPTION OF THE DRAWINGS

The above and other objects and features of the invention will become more apparent from the following detailed description with reference to the accompanying drawings, wherein.

DETAILED DESCRIPTION OF THE PREFERRED EMBODIMENTS

Figure 1:
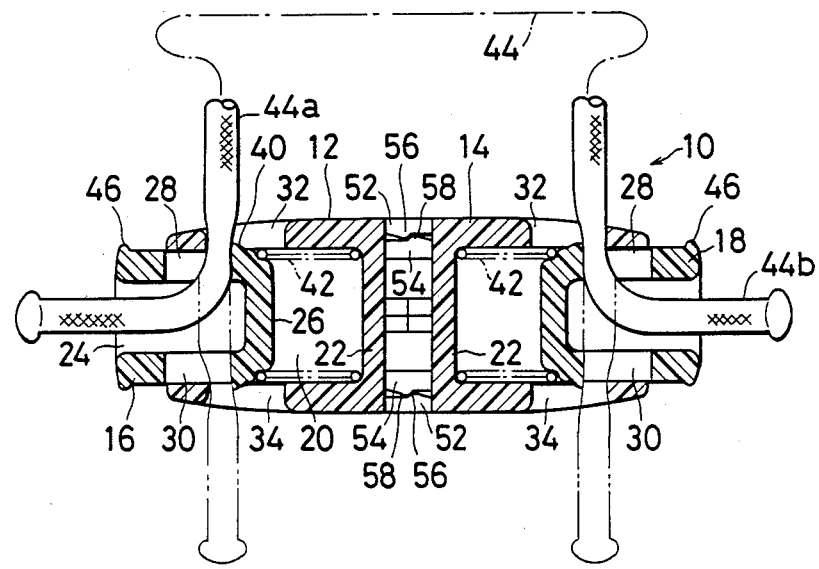
FIG. 1 is a sectional view of a cord lock according to the first embodiment of the present invention, with a pair of main bodies retained or interlocked.

FIGS. 1 through 8 illustrate a first embodiment of a cord lock according to the present invention. In the figures, a cord lock 10 comprises a pair of main bodies 12 and 14, and lock members 16 and 18 inserted into the main bodies 14 and 14.

The main bodies 12 and 14 have an identical configuration with respect to each other and are integrally formed of synthetic resin material as shown in FIGS. 3 through 6. The main bodies 12 and 14 are formed such that the outer diameters thereof become gradually smaller as they go toward each outer end in the axial direction. Each of the main bodies 12 and 14 has a hollow or cylindrical bore 20 formed therein from one end toward the other end thereof. Each of the bores 20 is closed by means of a flat plate or end wall portion 22 provided at the other end of each of the main bodies 12 and 14.

Figure 7:
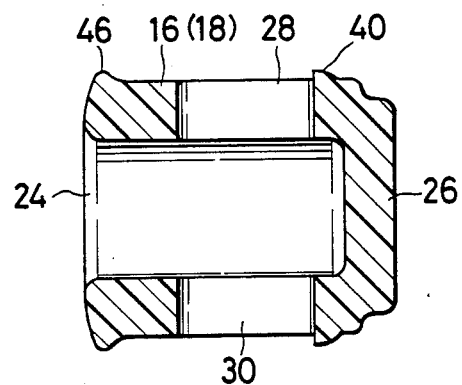
FIG. 7 is a sectional view of a lock member of the cord lock of FIG. 1.
Figure 8:
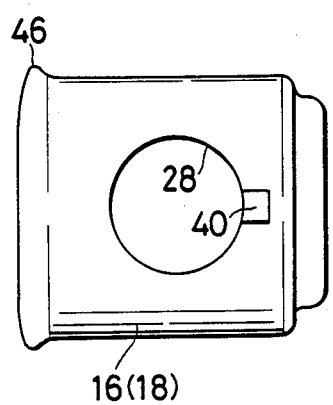
FIG. 8 is a plan view of the lock member of FIG. 7.

The bores 20 slidably accommodate therein the lock members 16 and 18 each having the identical configuration as shown in FIGS. 7 and 8. The lock members 16 and 18 are integrally formed of synthetic resin material so as to have a cylindrical configuration. A hollow or cylindrical bore 24 formed in the axial direction is closed by means of a flat plate or end wall portion 26 integral with the side walls defining bore 24.

The lock members 16 and 18 are provided with insertion holes 28 and 30 directed in the radial direction from intermediate portions thereof in the axial direction. These insertion holes 28 and 30 correspond to similarly disposed insertion holes 32 and 34 formed within the main bodies 12 and 14 and directed in the direction perpendicular to the axial direction thereof.

Each of the lock members 16 and 18 is provided at the marginal portion of apertures 28 and 30 near the flat plate portion 26 of the bore 24 with a lip portion 40 projecting in the radial direction. The outer diameter of the lock members 16 and 18 including the pair of lip portions 40 is slightly larger than the inner diameter of the cylindrical bores 20 of the main bodies 12 and 14. When the lock members 16 and 18 are inserted into the bores 20 of the main bodies 12 and 14 from the open ends of the cylindrical bores 20, the lip portions 40 and/or the sidewall portions defining the cylindrical bores 20 are temporarily elastically deformed so as to permit the lock members 16 and 18 to be inserted therein. After the lock members 16 and 18 are inserted, the lip portions 40 are engaged with the inner peripheral portion of the cylindrical bores 20 so as to prevent the lock members 16 and 18 from therefrom.

Between the flat plate portions 26 and 22 of the lock members 16 and 18 and main bodies 12 and 14, a compression coil spring 42 is interposed so as to bias the lock members 16 and 18 in the direction toward the open end of the main bodies 12 and 14.

Figure 2:
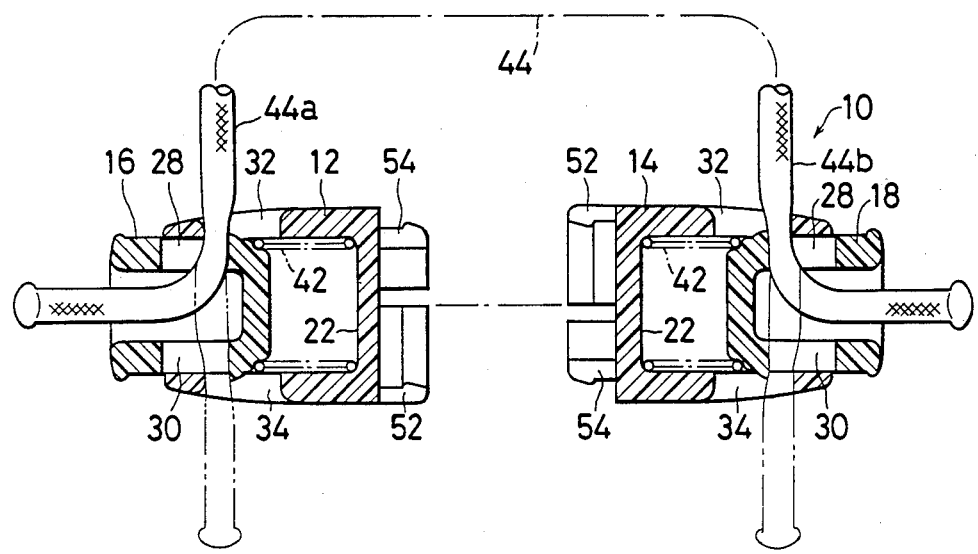
FIG. 2 is a sectional view of the cord lock of FIG. 1 wherein the pair of main bodies are unlocked.

By virtue of the foregoing arrangement, when both end portions 44a and 44b of the cord 44 are pulled out of the cylindrical bores 24 after passing through the insertion holes 32 and 28 as shown in FIGS. 1 and 2, the intermediate portion of the cord 44 is held by means of the biasing force of the compression coil spring 42 between the annular portion of the insertion hole 28 near the lip portion 40 and the annular portions of the insertion holes 32 communicating with the cylindrical bores 20. As a result, a resisting force is produced so as to prevent movement of the cord 44. The cord 44 may alternatively have the foremost ends inserted into the insertion holes 32 and 28 and pulled out of the holes 30 and 34 in the manner as shown by imaginary lines of FIG. 1.

The lock members 16 and 18 are formed at the outer periphery of the foremost end portions projecting out from the main bodies 12 and 14 with a wide diameter portion 46 respectively, so that a user may push the lock members 16 and 18 into the main bodies 12 and 14 by means of the wide diameter portions 46 so as to unlock the cord.

Figure 3:
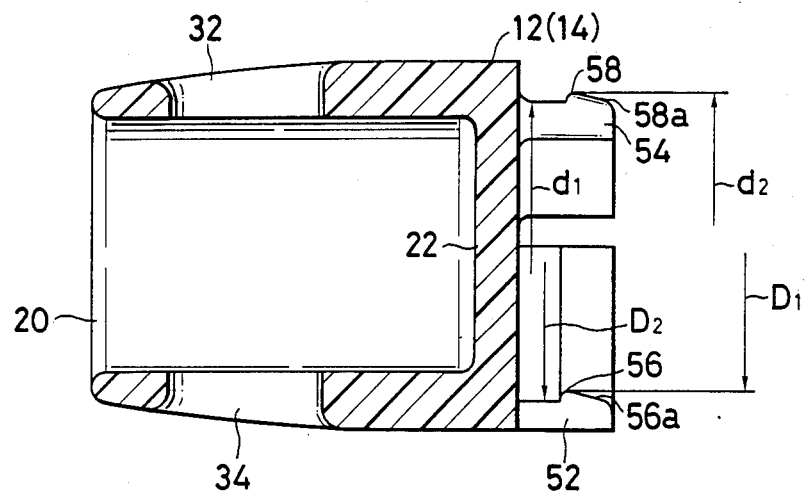
FIG. 3 is a sectional view of one main body of the cord lock of FIG. 1.
Figure 4:
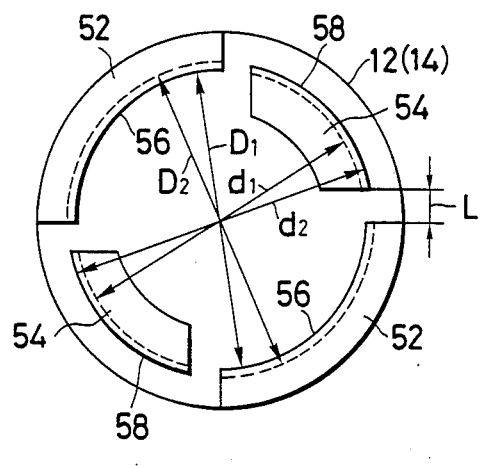
FIG. 4 is a right side view of the main body of FIG. 3.
Figure 5:
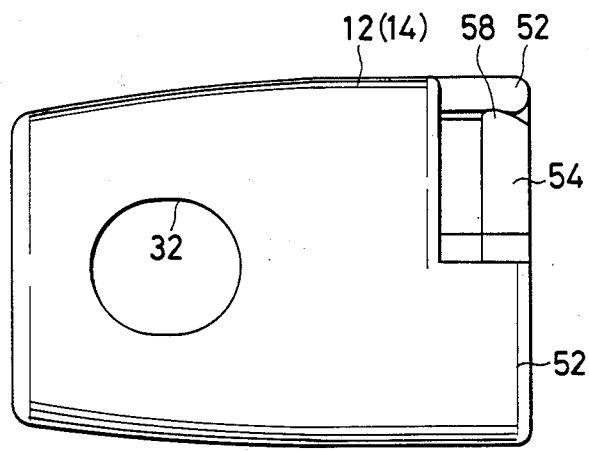
FIG. 5 is a plan view of the main body of FIG. 3.
Figure 6:
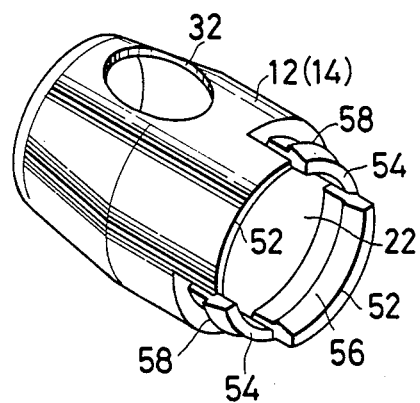
FIG. 6 is a perspective view of the main body of FIG. 3.

As shown in FIGS. 3 through 5, the main bodies 12 and 14 are provided with two pairs of arcuate, circumferentially extending projections 52 and 54 projecting axially from the outer surfaces of the flat plate portions 22. The pair of projections 52, as shown in FIG. 4, have a length of ¼ that of the circumferential extent of the main bodies 12 and 14, and the outer periphery thereof is flush with the outer periphery of the main bodies 12 and 14. Each of the projections 52 is provided with a radially projecting hook portion 56 projecting toward the axis of the main body from the inner peripheral surface thereof.

The pair of projections 54 are likewise disposed opposite to each other between the pair of projections 52 with the axis of the main bodies 12 and 14 interposed therebetween and they also have a length of approximately ¼ the circumferential extent of the main bodies. However, the outer diameter of the projections 54 is generally the same as the inner diameter of the projections 52. Between the circumferential end portion of the projection 54 and the circumferential end portion of each projection 52, a circumferential space having a dimension L is formed. Each of the projections 54 is formed upon the outer peripheral portion thereof with a hook portion 58 corresponding to the hook portion 56 of each projection 52.

The dimensional relationship defined between the projections 52 and 54 and the hook portions 56 and 58 will now be described in detail. The inner diameter $D_1$ defined between the hook portions 56 is generally the same as the outer diameter $d_1$ defined between the projections 54, whereas the outer diameter $d_2$ defined between the hook portions 58 is generally the same as the inner diameter $D_2$ defined between the projections 52.

Therefore, if the flat plate portions 22 of the main bodies 12 and 14 are coaxially disposed in an opposed relationship with respect to each other and if they are pushed together in such a manner as to dispose the projections 52 and 54 in opposition with respect to each other when viewed in the axial direction, these projections 52 and 54 are temporarily deformed and then the projections 54 are brought into engagement with the inner surfaces of each projection 52 as shown in FIG. 1 and, as a result, the hook projections 56 and 58 are engaged together so as to prevent the main bodies 12 and 14 from separating in the axial direction. Due to the foregoing arrangement, one of the hook portions 56 and 58 serves as an engaging portion and the other serves as an engaging recess.

In this way, since the projections 52 and 54 are formed with an identical configuration upon the main bodies 12 and 14 respectively, the main bodies 12 and 14 can be made exactly with the same configuration. Therefore, if a pair of such main bodies are made using only one mold, they can be used as the main bodies 12 and 14 respectively. Furthermore, since the lock members 16 and 18 which are to be inserted into the main bodies 12 and 14, are also of the same configuration, the parts constituting the cord lock 10 are only of three kinds, that is, main body 12, lock member 16 and compression coil spring 42.

The hook portion 56 and 58, as shown in FIG. 3, are formed with slanted or inclined surfaces 56a and 58a, respectively, so that the projections 54 are easily brought onto the inner surfaces of the other corresponding projections 52 when the engagement operation is performed.

The operation of a cord lock according to this embodiment will be described next.

After the compression coil springs 42 are inserted into the main bodies 12 and 14 respectively, the lock members 16 and 18 are inserted into the cylindrical bores 20 with the flat plate portions 26 entering the bores 20 first until the lip portions 40 are snap-fitted into the interiors of the cylindrical bores 20. By the foregoing procedure, the assembly is completed.

In order to insert the intermediate portions of the cord 44 into the main bodies 12 and 14, the lock members 16 and 18 are pushed into the main bodies by means of a small amount so as to bring the circular holes 28 and 30 into alignment with the other circular holes 32 and 34. By this procedure, the intermediate portions of the cord 44 can be attached to the main bodies 12 and 14 either in the state shown by the solid line of FIG. 1 or in the state shown by the imaginary line of FIG. 1. Upon releasing the pressure of the lock members 16 and 18 against the biasing forces of the springs 42, the intermediate portions of the cord 44 are held between the circular holes 28 and 32 by means of the biasing force of each compression coil spring 42. As a result, the movement of the cord 44 in the longitudinal direction is resisted. Therefore, in order to change the length of the loop portion of the cord 44, a force larger than the resisting force defined by the coil springs 42 may be applied to the cord 44 or otherwise the lock members 16 and 18 may be pushed into the main bodies 12 and 14 against the biasing force of the springs 42 so as to release the resistance defined by means of the springs 42.

In order to engage the main bodies 12 and 14 with each other, the main bodies are coaxially pushed into engagement with each other, with one projection 52 of one of the main bodies 12 and 14 facing the counterpart projection 54. By this procedure, the hook portions 56 and 58 of the projections 52 and 54 are engaged with each other as shown in FIG. 1.

In order to reverse the engagement of the main bodies so as to achieve disengagement thereof, the main bodies 12 and 14 are pulled in the direction separating the same from each other or otherwise a wrenching force for causing an intersection of the axes of the main bodies is applied to the main bodies so as to separate the hook portions 56 and 58. By this operation, the locking state can be released.

Figure 9:
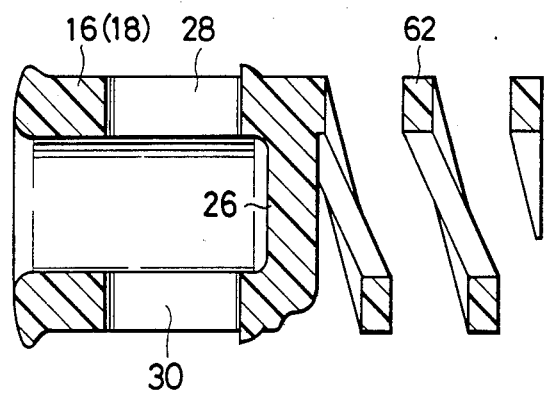
FIG. 9 is a sectional view showing a cord lock according to a second embodiment of the present invention.

FIG. 9 illustrates a cord lock according to a second embodiment of the present invention. In this embodiment, the compression coil spring 42 is integrally formed with the lock member 16 (18). That is, the flat plate portion 26 of the lock member 16 (18) is integrally connected with one end of a compression coil spring 62 made of synthetic resin material. Due to the foregoing structure, the lock member 16 (18) and the compression spring 62 can be made by means of the same mold. Therefore, the number of component parts can be reduced as compared with the preceding embodiment.

Figure 10:
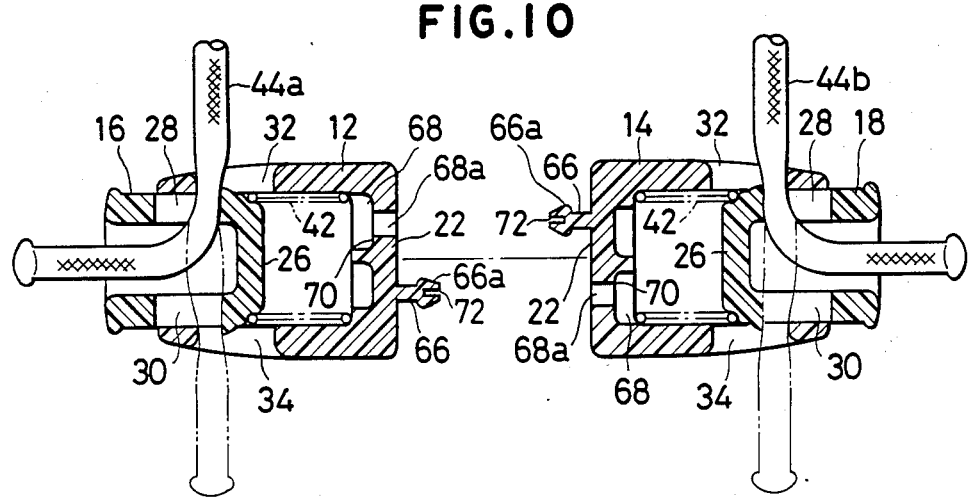
FIG. 10 is a sectional view showing a cord lock according to a third embodiment of the present invention, wherein a pair of main bodies are unlocked.
Figure 11:
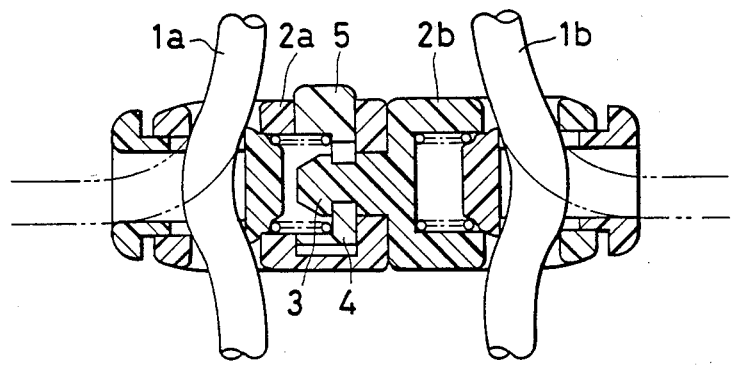
FIG. 11 is a sectional view of a cord lock according to the prior art.

FIG. 10 illustrates a cord lock according to a third embodiment of the present invention. In this embodiment, the main bodies 12 and 14 are provided with a projection 66 projecting from the flat plate portions 22 thereof respectively, whereas the counterpart surface portions provided with holes 68 serving as engaging recesses for receiving the projections 66 respectively. Each of the holes 68 has an inlet portion formed with a small diameter hole 68a through means of a stepped portion 70, whereas each of the projections 66 is formed with a wide diameter portion 66a at the foremost end thereof, a slit 72 rendering portion 66a elastically deformable.

Therefore, when the pair of main bodies 12 and 14 are pushed together and when the wide diameter portions 66a of the projections 66 are inserted into the small diameter holes 68a, the wide diameter portions 66a which have been temporarily elastically deformed and contracted are widened within the holes 68 so as to engage with the stepped portions 70 and thereby maintain the engaged state of the main bodies 12 and 14. The remaining structure is generally the same as that of the preceding first embodiment.

The present invention is applicable to other components as long as they have a pair of main bodies 12 and 14 having the same configuration which are formed with an engaging portion and an engaging recess having the same configuration.

As described in the foregoing, according to the present invention, a pair of main bodies are formed with the same configuration. Therefore, the intermediate portions of a cord can be separably held. In addition, a cord lock of the present invention is simple in configuration and easy to manufacture.

Obviously, many modifications and variations of the present invention are possible in light of the above teachings. It is therefore to be understood that within the scope of the appended claims, the present invention may be practiced otherwise than as specifically described herein.

What is claimed is:

1. A cord lock, comprising:
    a pair of cylindrical main bodies, having a longitudinal axis defined therein, for permitting intermediate portions of a cord to extend therethrough; and
    a pair of lock members movably mounted upon said main bodies for respectively cooperating with said main bodies so as to develop a predetermined force resisting movement of said intermediate portions of said cord in its longitudinal direction relative to said main bodies and said pair of lock members;
    each one of said pair of main bodies being formed with tubular circumferentially extending engaging means, for permitting engagement and disengagement of said pair of main bodies with respect to each other, comprising at least one engaging projecting having a first predetermined circumferential extent about said longitudinal axis of said main body, and at least one engaging recess, for reception of said at least one engaging projection of the other one of said pair of main bodies, having a second predetermined circumferential extent about said longitudinal axis of said main body.

2. A cord lock as claimed in claim 1, wherein:
    said main bodies comprise hollow cylinders open at one end and closed by means of an end wall at the opposite end; and
    said at least one engaging projection and said at least one engaging recess are formed upon the exterior surfaces of said end walls of said main bodies.

3. A cord lock as set forth in claim 1, wherein:
    each one of said lock members comprise a hollow cylinder open at one end and closed by means of an end wall at the opposite end thereof; and
    each one of said main bodies comprises a hollow cylinder open at one end thereof and closed by means of an end wall at the opposite end thereof.

4. A cord lock as set forth in claim 3, further comprising:
    spring biasing means interposed between said end walls of said main bodies and said lock members for biasing said lock members into operative cooperative positions with respect to said main bodies.

5. A cord lock as claimed in claim 4, wherein:
each one of said lock members has said spring biasing means integrally formed upon the exterior surface of said end wall thereof.

6. A cord lock as set forth in claim 3, wherein:
aperture means are defined within sidewall portions of said main bodies and said lock members for permitting said intermediate portions of said cord to be passed through said main bodies and said lock members and be retained within said cord lock by means of said operative cooperation defined between said main bodies and said lock members.

7. A cord lock as set forth in claim 1, wherein:
said main bodies have identical configurations.

8. A cord lock as set forth in claim 1, wherein:
said lock members have identical configurations.

9. A cord lock as set forth in claim 1, wherein:
said at least one engaging projection comprises two diametrically opposed engaging projections each having a circumferential extent of approximately one-quarter the circumferential extent of each one of said main bodies; and
said at least one engaging recess comprises two diametrically opposed engaging recesses each having a circumferential extent of approximately one-quarter the circumferential extent of each one of said main bodies and alternately disposed in the circumferential direction about said longitudinal axis of each one of said main bodies with said two diametrically opposed engaging projections.

10. A cord lock as set forth in claim 9, wherein:
said engaging projections and said engaging recesses are radially offset with respect to each other wherein the outer diameter of said engaging recesses is approximately equal to the inner diameter of said engaging projections.

11. A cord lock as set forth in claim 10, wherein:
the axial extent of said engaging projections and said engaging recesses are substantially the same such that distal end portions of said engaging projections and said engaging recesses are disposed within a common axial plane.

12. A cord lock as set forth in claim 1, wherein:
the axial extent of said at least one engaging projection and said at least one engaging recess is substantially the same such that distal end portions of said at least one engaging projection and said at least one engaging recess are disposed within a common axial plane.

13. A cord lock as set forth in claim 1, wherein:
said at least one engaging projection and said at least one engaging recess are radially offset with respect to each other wherein the outer diameter of said at least one engaging recess is substantially equal to the inner diameter of said at least one engaging projection.

14. A cord lock as set forth in claim 13, wherein:
the axial extent of said at least one engaging projection and said at least one engaging recess is substantially the same such that distal end portions of said at least one engaging projection and said at least one engaging recess are disposed within a common axial plane.

* * * * *